April 23, 1968   A. L. WOOLDRIDGE   3,378,930
MEASURING DEVICE
Filed Aug. 31, 1966
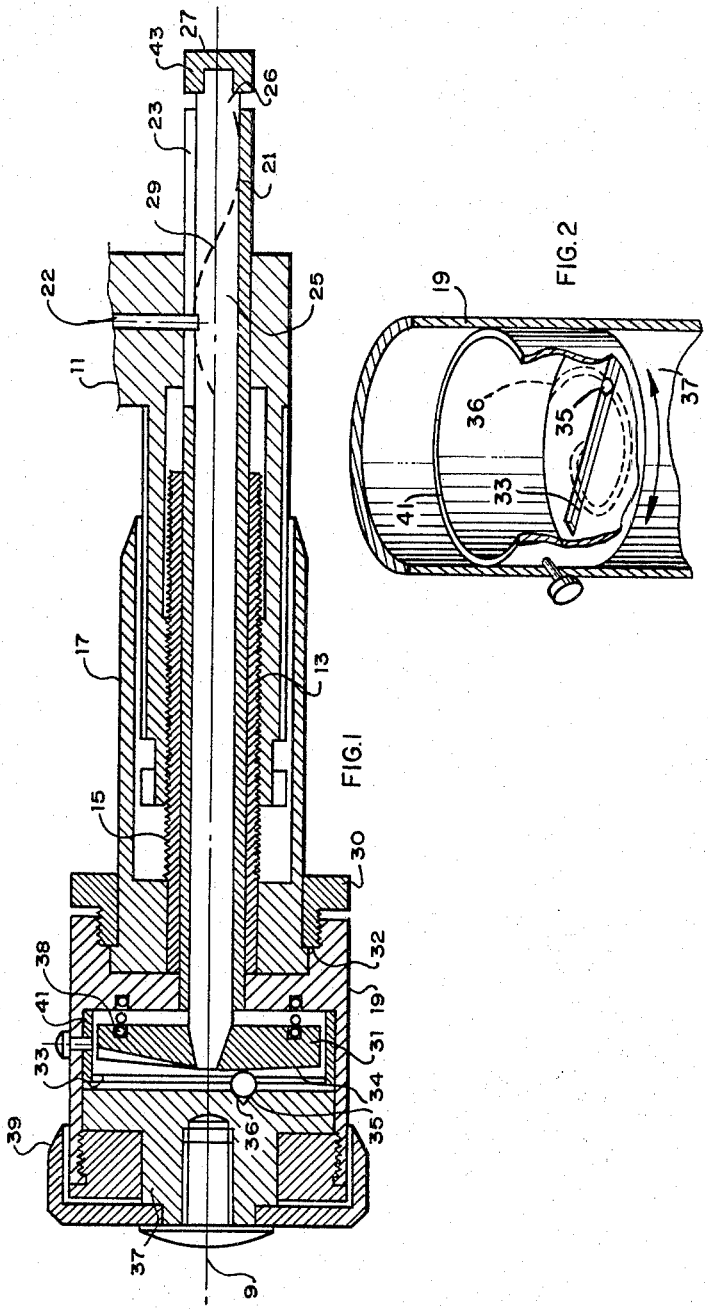
INVENTOR
ALBERT L. WOOLDRIDGE
BY  *A. C. Smith*
ATTORNEY

United States Patent Office 3,378,930
Patented Apr. 23, 1968

3,378,930
MEASURING DEVICE
Albert L. Wooldridge, Manitou Springs, Colo.
(438 Donohoe, 2, Palo Alto, Calif. 94303)
Filed Aug. 31, 1966, Ser. No. 576,469
Claims priority, application Great Britain, Sept. 13, 1965, 39,076/65
5 Claims. (Cl. 33—170)

ABSTRACT OF THE DISCLOSURE

A micrometer-like measuring device includes a variable pitch helix for incorporating a selected correction factor into length or distance measurements. A measuring device as disclosed herein obviates the need for individually calculating adjustment of part dimensions to compensate for casting shrinkages, material compaction and the like. This is accomplished according to the illustrated embodiment of the present invention by providing a cam spindle which is free to move axially with the spindle of a micrometer-type spindle and barrel. As the barrel is rotated to extend or withdraw the spindle with respect to a frame, the cam spindle is rotated about one turn over the axial adjustment length of the spindle by a helix in the spindle which is keyed to the frame. This one-turn motion of the cam spindle positions a ball between a reference plane and the radially-diverging surface of the spindle cam such that the radial position of the ball outward from the rotational axis of the barrel and cam spindle determines the correction factor incorporated in the distance measurement.

---

Other and incidental aspects and features of the present invention will be apparent from a reading of this specification and an inspection of the accompanying drawing in which FIGURE 1 shows a sectional view of the measuring device of the present invention, and FIGURE 2 shows a partial sectional view of the measuring device of FIGURE 1 showing only the ball retainer with its diametrical slot, the ball and the adjusting cam with its spiral slot.

Referring to FIGURES 1 and 2 of the drawing, the present invention is only shown in sectional view in the diametrical section plane through central axis 9 for clarity and ease of comprehension, but it should be understood that the device of the present invention substantially entirely includes geometrical shapes of revolution and symmetry about the central axis 9. The frame 11, which may include a conventional crescent-shaped anvil support for making external measurements or a conventional surface-contacting foot for making internal or depth measurements, includes a threaded portion 13 which mates with the threaded portion 15 of thimble 17. As this thimble rotates, it moves axially and carries axially with it the barrel 19 and the attached aligning tube 21. The key or aligning pin 22 in frame 11 slides in the slot 23 in the end of aligning tube 21 to prevent rotation of the tube 21 and barrel 19 and to permit free axial movement of these elements. The cam spindle 25 passes through the aligning tube 21 and including a protruding end 26 therebeyond which is fitted with a tip 43 that provides at its distal end the work-engaging measurement surface 27. The key or aligning pin 22 also engages a helix 29 provided in the cam spindle 25 near its protruding end 26. This helix extends longitudinally in less than one revolution over the measurement adjustment distance of the cam spindle 25 and aligning tube 21. The helix 29 and aligning pin 22 thus operate to rotate the cam spindle less than one revolution as it is moved axially over its range of movement by many revolutions of the thimble 17. The nut 30 is freely rotatable on the thimble 17 and is threaded into the barrel 19 against the shoulder 32 on thimble 17 in order to couple the longitudinal movement of the thimble 17 to the barrel 19 and hence to the aligning tube 21 as the thimble 17 is rotated on the frame 11. Compensating cam 31 attached to the end of cam spindle 25 remote from the protruding end 26 has a cam surface 34 in the shape of a helix which has a pitch (i.e., the measure of longitudinal advance along its rotational axis 9 per unit of angular rotation about axis 9) that varies continuously with increasing radial distance out from the axis 9. A ball 35 engages cam surface 34 and is constrained by the ball retainer 41 which is attached to barrel 19 to move only along the diametrical slot 33 in the retainer 41. The ball 35 is held at the selected radial position relative to the central axis 9 where the diametrical slot 33 in retainer 41 intersects the spiral slot 36 provided in the ball adjusting cam 37. Thus, rotation of the ball adjusting cam 37 relative to the barrel 19 adjusts the position of the ball 35 radially across the surface 34 of the compensating cam 31 and hence determines the pitch of the cam surface 34 which provides the measurement correction. A pointer and a scale 39 calibrated in measurement correction units may thus be provided on the barrel 19 and ball compensating cam 37 to provide a direct indication of the amount of measurement correction or compensation being provided by the present invention. Spring 38 urges the compensating cam 31 and the ball 35 against the ball adjusting cam 37 as the cam spindle 25 moves longitudinally with respect to the ball adjusting cam 37 and barrel 19. It should be understood that the cam surface 34 may have any selected shape which imparts a desired amount of longitudinal motion to the cam spindle 25 per unit of angular rotation thereof and specifically may have a non-linear pitch with rotation of the compensating cam 31 for any given radial position of ball 35. Also, it should be understood that for greater mechanical rigidity, two or more balls 35 may be used where each ball rides in its individual slot 36 which spirals outwardly at an angular rate which is two or more times faster than that previously described for one ball and where the cam surface 34 is duplicated in two or more equal-angle portions of its periphery and the helix 29 covers one half or less revolutions of cam spindle 25.

Thus rotation of the thimble 17 produces a related rotation of the compensating cam 31 which moves the cam spindle 25 in or out relative to the thimble 17 by an amount proportional to the pitch of the compensating cam surface 34 along a circular path thereon of radius equal to the distance from the central axis 9 to the position of ball 35 in diametrical slot 33. The compensating cam surface 34 should thus have a range of pitches (helices) along circular paths thereon of given radii to provide measurement compensation over a range which corresponds to the range of shrinkages (or expansions) of selected materials being worked with.

Also, this cam surface 34 may have a flat portion (i.e., zero pitch) within a circular path of small radius about the center so that no compensation is provided when the ball 35 is positioned on this flat portion, thereby permitting the present device to be operated as a conventional micrometer. The tip 43 of the cam spindle may be replaced with extension pieces as where the present measuring device is required to provide a measurement range which starts from a selected length rather than from zero.

Therefore, the measuring device of the present invention automatically corrects or compensates a length measurement for a selected amount of material shrinkage or expansion by introducing a variable amount of correctional movement into the normal movement of the measuring element.

I claim:
1. Measuring apparatus comprising:
a frame and an elongated member supported therein to move longitudinally with respect to said frame;
a spindle disposed to move longitudinally and rotationally with respect to said elongated member;
means coupling said frame and said spindle for rotating the spindle in response to longitudinal motion thereof relative to said frame;
a flange attached to said spindle for rotational and longitudinal movement therewith and having a first surface thereon of helical shape having a selected pitch along a circular path thereon at a selected radius from the rotational axis of said spindle;
an element coupled to said elongated member in fixed longitudinal positional relationship thereto and disposed in position facing said first surface; and
means resiliently urging said element and first surface into engagement for maintaining contact therebetween along said circular path as said flange and spindle rotate relative to said element.

2. Measuring apparatus as in claim 1 comprising:
a second surface of substantially planar shape is disposed normal to the rotational axis of said spindle and facing said flange;
the first surface is a helix having pitch along circular paths thereon which varies continuously with increasing radii of the circular paths; and
said element engaging the first surface includes a point-contacting member positioned between the first and second surfaces at a selected radius from the rotational axis of said spindle.

3. Measuring apparatus as in claim 1 wherein:
said elongated member includes a hollow spindle having a longitudinal slot therein;
a pin attached to said frame for engaging said slot to prevent rotation of said hollow spindle relative to said frame; and comprising:
rotatable means threaded to said frame for longitudinal movement thereon in response to rotation of said rotatable means;
barrel means coupling the longitudinal movement of said rotatable means to said hollow spindle; and
a helical groove in said spindle disposed to engage said pin for rotating said spindle and the flange attached thereto in response to the longitudinal movement of said hollow spindle.

4. Measuring apparatus as in claim 2 comprising:
a spirally outwardly extending groove in the second surface;
the point-contacting member is a ball disposed to ride in said groove; and
means are disposed between the first and second surfaces for positioning said ball in said groove at a selected radius from the rotational axis of said spindle.

5. Measuring apparatus as in claim 3 wherein:
said barrel means includes a barrel attached to said hollow spindle and includes an end piece fixedly attached to said element and rotatably mounted on said barrel, and includes a ball retainer attached to said barrel having a slot therein which traverses the first surface along a substantially radially outward extending path with said ball disposed within said slot, whereby rotation of said end piece relative to said barrel alters the radial position of the ball in said spirally outwardly extending groove.

No references cited.

HARRY N. HAROIAN, *Primary Examiner.*